United States Patent
Tahara et al.

(10) Patent No.: US 9,017,758 B2
(45) Date of Patent: Apr. 28, 2015

(54) COATING AGENT COMPOSITION

(75) Inventors: Noriaki Tahara, Shunan (JP); Junji Momoda, Shunan (JP); Katsuhiro Mori, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 1976 days.

(21) Appl. No.: 10/592,735

(22) PCT Filed: Mar. 14, 2005

(86) PCT No.: PCT/JP2005/004876
§ 371 (c)(1),
(2), (4) Date: Feb. 8, 2007

(87) PCT Pub. No.: WO2005/087882
PCT Pub. Date: Sep. 22, 2005

(65) Prior Publication Data
US 2008/0241372 A1 Oct. 2, 2008

(30) Foreign Application Priority Data
Mar. 15, 2004 (JP) ................................ 2004-073266

(51) Int. Cl.
| | |
|---|---|
| B05D 5/06 | (2006.01) |
| C03C 17/00 | (2006.01) |
| G02B 1/10 | (2006.01) |
| C09D 4/00 | (2006.01) |
| C09D 7/12 | (2006.01) |
| C09D 183/04 | (2006.01) |
| G02B 27/22 | (2006.01) |
| C08K 3/22 | (2006.01) |

(52) U.S. Cl.
CPC ... C09D 4/00 (2013.01); C08K 3/22 (2013.01); C09D 7/1216 (2013.01); C09D 183/04 (2013.01); G02B 1/105 (2013.01); G02B 27/2214 (2013.01)

(58) Field of Classification Search
CPC ...... C09D 4/00; C09D 7/1216; C09D 183/04; G02B 27/2214; G02B 1/105; C08K 3/22
USPC ........................... 252/582–589; 427/160–169
See application file for complete search history.

(56) References Cited

U.S. PATENT DOCUMENTS

| | | | |
|---|---|---|---|
| 4,211,823 A | | 7/1980 | Suzuki et al. |
| 4,603,442 A | * | 8/1986 | Barfield ............................ 2/447 |
| 4,994,208 A | * | 2/1991 | McBain et al. ............... 252/586 |
| 6,497,958 B1 | | 12/2002 | Abe et al. |
| 2003/0073779 A1 | | 4/2003 | Tamori et al. |
| 2003/0096117 A1 | | 5/2003 | Kawabata et al. |

FOREIGN PATENT DOCUMENTS

| | | | |
|---|---|---|---|
| JP | 53-111336 | | 9/1978 |
| JP | 53-111336 | A | 9/1978 |
| JP | 56-88468 | A | 7/1981 |
| JP | 56-88468 | A | 7/1981 |
| JP | 57-2735 | B2 | 1/1982 |
| JP | 59-102964 | | 6/1984 |
| JP | 63-197635 | A | 8/1988 |
| JP | 63-280790 | A | 11/1988 |
| JP | 1-38419 | B2 | 8/1989 |
| JP | 01-309003 | A | 12/1989 |
| JP | 09-111186 | A | 4/1997 |
| JP | 09-111186 | A | 4/1997 |
| JP | 10-120972 | A | 5/1998 |
| JP | 10-120972 | A | 5/1998 |
| JP | 10-120972 | A * | 12/1998 ........... C09D 163/00 |
| JP | 11-116843 | A | 4/1999 |
| JP | 11-119001 | A | 4/1999 |
| JP | 11-119001 | A | 4/1999 |
| JP | 11-170387 | A | 6/1999 |
| JP | 2002-332354 | A | 11/2002 |
| JP | 2002-332354 | A | 11/2002 |
| WO | WO-01/42381 | | 6/2001 |
| WO | WO-01/42831 | A1 | 6/2001 |
| WO | WO 01/60811 | A1 | 8/2001 |
| WO | WO-01/60811 | A1 | 8/2001 |

OTHER PUBLICATIONS

Japanese Office Action issued Feb. 15, 2011 in corresponding Japanese patent application No. 2006-511074.

* cited by examiner

Primary Examiner — David Turocy
Assistant Examiner — Michael G Miller
(74) Attorney, Agent, or Firm — Birch, Stewart, Kolasch & Birch, LLP

(57) ABSTRACT

A coating agent composition obtained by mixing fine inorganic oxide particles, a polymerizable alkoxysilane compound, a polymerizing catalyst, an acid aqueous solution and an organic solvent, and satisfying the following conditions (1) to (3):

(1) the polymerizing catalyst is at least partly an acetylacetonato complex;
(2) a β-dicarbonyl compound (excluding acetylacetonato complex) having two carbonyl groups in the molecule via a carbon atom, is further contained as a catalyst stabilizer; and
(3) the fine inorganic oxide particles and the alkoxysilane compound are contained in a total amount of 23 to 40% by mass.

The coating agent composition is capable of forming a cured film having excellent properties such as abrasion resistance on the surfaces of plastic ophthalmic lens through the curing conducted at a low temperature for a short period of time, and does not affect the color tone of the lens material even when it is directly applied to the surfaces of the plastic lens material that contains a coloring matter, such as sunglass lenses.

3 Claims, No Drawings

COATING AGENT COMPOSITION

TECHNICAL FIELD

The present invention relates to a coating agent composition for forming a transparent film having excellent abrasion resistance, weather-proof property and light resistance on the surfaces of plastic lenses.

BACKGROUND ART

Plastic lenses are now becoming a mainstream in the field of spectacle lenses owing to their such features as light in weight, safety, easy workability and fashionable facets that are not obtained with the glass lenses.

The plastic lenses, however, have a defect in that they are vulnerable to be scarred. It is, therefore, a generally accepted practice to coat the surfaces of the plastic resins with a silicone film. The silicone coating (called hard coating) is, usually, formed by applying a coating agent comprising, chiefly, fine inorganic oxide particles, a polymerizable organosilane compound, a polymerizing catalyst, an acid aqueous solution and an organic solvent onto the surfaces of the plastic lenses, followed by heating to cure the coating agent as well as to volatilize the organic solvent (JP-B-57-2735). Attempts have been made to improve the coating agents of this kind, such as improving the refractive index and preservation stability (pamphlet of International Laid-Open 01/42381).

DISCLOSURE OF THE INVENTION

In recent years, however, the spectacle lenses are diversifying and a variety of properties have been demanded for the coating agents, too, to meet the modes of the ophthalmic lenses. For instance, the coating agent is usually cured under the conditions of a curing temperature of about 120° C. and a curing time of about 3 hours. In the Asian markets and the U.S. markets that are rapidly growing in recent years, however, it has been urged to cure the coating agent at a lower temperature and in a shorter period of time to increase the productivity and to suppress the deformation of lenses and to suppress the development of yellow color yet maintaining the basic properties required thus far. It is further becoming obvious that when a hard coating is formed by directly applying a conventional coating agent onto the surfaces of the lens material containing a coloring matter, such as sunglasses and photochromic ophthalmic lenses, there occurs a problem in that the color tone of the lens material (color tone at the time of activating color in the case of the photochromic lens) changes due to the formation of the hard coating.

It is therefore an object of the present invention to provide a coating agent capable of forming a hard coating having a sufficient degree of properties through the curing at a low temperature and within a short period of time and of preventing a change in the color tone of the coloring matter when applied to the surfaces of a lens material containing a coloring matter.

The present inventors have conducted a keen study in an effort to solve the above problem. As a result, the inventors have discovered that a desired object can be achieved when particular components are selected and when the contents of fine inorganic oxide particles and of a polymerizable organosilane compound are specified to lie within predetermined ranges, and have arrived at the present invention.

According to the present invention, there is provided a coating agent composition obtained by mixing fine inorganic oxide particles, a polymerizable alkoxysilane compound, a polymerizing catalyst, an acid aqueous solution and an organic solvent, and satisfying the following conditions (1) to (3):

(1) the polymerizing catalyst is at least partly an acetylacetonato complex;

(2) a β-dicarbonyl compound (excluding acetylacetonato complex) having two carbonyl groups in the molecule via one carbon atom, is further contained as a catalyst stabilizer; and (3) the fine inorganic oxide particles and the alkoxysilane compound are contained in a total amount of 23 to 40% by mass.

According to the present invention, there is further provided a method of producing plastic lenses by applying the coating agent composition onto the surfaces of a plastic lens material containing a coloring matter to form a coating layer, and curing the coating layer to form a cured film.

According to the present invention, there is further provided a plastic lens obtained by forming a cured film which is a cured body of the coating agent composition on surfaces of a plastic lens material containing a coloring matter.

The coating agent composition of the invention has a distinguished advantage in that a hard coating having a sufficient degree of properties can be formed through the curing at a low temperature within a short period of time. To obtain a hard coating having a sufficient degree of properties, for example, a conventional coating agent is cured under the conditions of a temperature of 120° C. for about 3 hours. According to the present invention, however, the curing temperature can be set to be 100° C. to 110° C. and the curing time can be set to be 1 to 2 hours, making it possible to greatly increase the productivity.

The coating agent composition of the present invention exhibits an excellent feature of not varying the color tone even when the film is formed by directly applying the coating agent composition onto the lens material containing a coloring matter, such as sunglasses.

Further, when applied to the lens material containing a photochromic compound as a coloring matter, the coating agent composition of the present invention exhibits the effect of improving the light resistance and the weather-proof property against the repetition of color activating and fading of the photochromic compound.

BEST MODE FOR CARRYING OUT THE INVENTION

Like a conventional coating agent, the coating agent composition of the present invention is obtained by mixing fine inorganic oxide particles, a polymerizable alkoxysilane compound, a polymerizing catalyst, an acid aqueous solution and an organic solvent, which, however, must satisfy all of the following three conditions (1) to (3) making a difference from the conventional known coating agents.

(1) The polymerizing catalyst is at least partly an acetylacetonato complex.

(2) A β-dicarbonyl compound (excluding acetylacetonato complex) having two carbonyl groups in the molecule via a carbon atom, is further contained as a catalyst stabilizer.

(3) The fine inorganic oxide particles and the alkoxysilane compound are contained in a total amount of 23 to 40% by mass.

That is, the excellent effect of the present invention is not obtained if any one of the above conditions (1) to (3) is not satisfied. For example, many of the coating agents (hard coating solutions) for hard coating that have now been put into practical use are containing fine inorganic oxide particles and a polymerizable alkoxysilane compound in a total amount of about 17 to about 22% by mass. With the above hard coating solutions, however, it is not possible to obtain cured film properties to a sufficient degree under the curing conditions of a low temperature and a short period of time and, besides, a change in the color tone cannot be suppressed even by using an acetylacetonato complex as a catalyst and even by adding a β-dicarbonyl compound as a catalyst stabilizer. Further, even when the fine inorganic oxide particles and the alkoxysilane compound are used in a total amount of 23 to 40% by mass, the cured film properties are not obtained to a sufficient degree under the curing conditions of a low temperature and a short period of time and the change in the color tone is not suppressed, either, if there is used a catalyst (e.g., ammonium perchlorate or sodium acetate) other than the acetylacetonato complex as the polymerizing catalyst. Further, when a compound other than the β-dicarbonyl compound is used as the catalyst stabilizer, the stabilizing effect is not sufficient arousing such problems as an increased viscosity of the coating agent composition after preserved for extended periods of time and a decrease in the abrasion resistance of the cured film that is obtained, making it difficult to obtain the effect of the present invention which is to obtain a cured film having favorable properties through the curing at a low temperature for a short period of time.

The components used in the conventional coating agents can be used without any particular limitation for the coating agent composition of the present invention as far as the above conditions (1) to (3) are all satisfied.

—Fine Inorganic Oxide Particles—

As the fine inorganic oxide particles, there can be used any known fine inorganic oxide particles that have heretofore been used for the coating agents of low refractive indexes and high refractive indexes. From the standpoint of abrasion resistance of the obtained cured film (hard coating), however, it is desired to use fine particles of an oxide or a composite oxide containing at least one kind of element selected from Si, Al, Ti, Fe, In, Zr, Au, Sn, Sb, W and Ce and, particularly, fine particles of an oxide or a composite oxide containing at least one kind of element selected group the group consisting of Si, Al, Ti, Fe, Zr, Sn, Sb and W. The particle size of the fine inorganic oxide particles is not particularly different from that employed by the conventional coating agents, and the average particle size is, preferably, 1 to 300 nm. The fine particles of the above particle sizes are usually used being dispersed in water or in part of the organic solvent (particularly, alcohol solvent) as a dispersing medium, and are usually colloidally dispersed so as to be prevented from being coagulated.

The blending amount of the fine inorganic oxide particles may be suitably determined depending upon the kind of the metal oxide, properties desired for the cured film finally obtained and the object, and is used in an amount in a range of 25 to 400 parts by mass and, particularly, 50 to 150 parts by mass per 100 parts by mass of the polymerizable alkoxysilane compound that will be described later. When the fine inorganic oxide particles are used in an amount within the above range, the ratio of the fine inorganic oxide particles in the cured film that is finally formed becomes 20 to 80% by mass and, particularly, 40 to 60% by mass. The mass of the cured film can be found by weighing the mass of the solid component that remains after the coating agent composition is heated at 120° C. for 2 hours. That is, the mass of the cured film is substantially the sum of masses of the fine inorganic oxide particles, cured body of the polymerizable alkoxysilane compound, polymerizing catalyst and acid.

—Alkoxysilane Compound—

The polymerizable alkoxysilane compound is the one having two or more alkoxyl groups which are functional groups, and there can be used without limitation any known alkoxysilane compound that has been used for the conventional coating agents as disclosed in, for example, JP-B-1-38419 and JP-A-11-116843. Concrete examples of the alkoxysilane compound include vinyltrimethoxysilane, vinyltriethoxysilane, vinyldimethoxyethoxysilane, γ-glycidoxypropyltrimethoxysilane, γ-glycidoxypropylmethyldimethoxysilane, γ-methacryloxypropyltrimethoxysilane, γ-mercaptopropyltrimethoxysilane, β-(3,4-epoxycyclohexyl)ethyltrimethoxysilane, γ-aminopropyltriethoxysilane, allyltrialkoxysilane and acryloxypropyltrialkoxysilane, which can be used in one kind or in a combination of two or more kinds. These alkoxysilanes are used in a form of being at least partly hydrolyzed or in a form of a partly condensed product obtained by the condensation of the partly hydrolyzed products thereof. The present invention preferably employs the γ-glycidoxypropyltrimethoxysilane, γ-glycidoxypropylmethyldimethoxysilane, a partly hydrolyzed product thereof or a partial condensation product thereof from the standpoint of adhesion to the plastic lenses and crosslinking property.

From the standpoint of improving the film properties, further, it is desired that the alkoxysilane compound is used in a form of at least being partly hydrolyzed such as being mixed with an acid aqueous solution in advance, or being mixed with other components in a state of a partial condensation product in which the hydrolyzed product is partly condensed. In this case, the alkoxysilane compound is desirably hydrolyzed at a temperature of 20 to 40° C. When the temperature is lower than 20° C., the abrasion resistance of the cured film tends to be decreased. When the hydrolysis is conducted at a temperature in excess of 40° C., on the other hand, the preservation stability of the coating agent composition may often decrease.

To prevent the cured film from cracking and to prevent a drop in the preservation stability of the coating agent composition, it is necessary in the present invention to use the alkoxysilane compound together with the fine inorganic oxide particles in a total amount of 23 to 40% by mass and, particularly, 25 to 35% by mass (condition (3) described earlier). Usually, it is desired that the coating agent composition is blended with the alkoxysilane compound in a manner that the component stemming from the alkoxysilane compound exists in an amount of 20 to 80% by mass and, particularly, 40 to 60% by mass in the cured film that is finally formed.

—Acid Aqueous Solution—

An acid aqueous solution is for accelerating the hydrolysis of the polymerizable alkoxysilane compound, and any known acid can be used without limitation provided it has a function for accelerating the hydrolysis. Concrete examples of the acid include inorganic acids such as hydrochloric acid, sulfuric acid, nitric acid and phosphoric acid, as well as organic acids such as acetic acid and propionic acid. Among them, hydrochloric acid is preferably used from the standpoint of preservation stability of the coating agent composition and the hydrolysis. The concentration of the acid aqueous solution is 0.001 to 0.5 N and, particularly, 0.01 to 0.1 N. In the coating agent composition of the present invention, the acid aqueous solution is mixed with the components. Therefore, the fine inorganic oxide particles, alkoxysilane and other components assume the form of a solution being dissolved or dispersed in a mixed solvent of water and an organic solvent that will be described below.

The acid aqueous solution is used in such an amount that effectively accelerates the hydrolysis of the alkoxysilane compound with the acid, and is blended in the coating agent composition in an amount of 5 to 100 parts by mass, preferably, 10 to 80 parts by mass and, most preferably, 15 to 50 parts by mass per 100 parts by mass of the alkoxysilane.

—Organic Solvent—

The organic solvent used for the coating agent composition of the present invention may be a known organic solvent provided it has a function for dissolving the polymerizable alkoxysilane compound and for dispersing the fine inorganic oxide particles, and has volatility. Examples of the organic solvent includes alcohols such as methanol, ethanol, propanol, isopropanol, butanol and diacetone alcohols; lower alcohol esters such as methyl acetate, ethyl acetate and propyl acetate; ethers such as cellosolve, dioxane and ethylene glycol monoisopropyl ether; ketones such as acetone, methyl ethyl ketone and methyl isobutyl ketone; halogenated hydrocarbons such as methylene chloride; and aromatic hydrocarbons such as benzene, toluene and xylene. These organic solvents can be used in one kind or being mixed together in two or more kinds. Among these organic solvents, it is particularly desired to use methanol, isopropanol, t-butyl alcohol, diacetone alcohol, ethylene glycol monoisopropyl ether or dioxane from the standpoint of exhibiting compatibility with the aqueous solution of the acid, easily volatilizing before the coating composition that is applied is cured, and forming a smoothly cured film. Further, the organic solvent may be partly mixed with the fine inorganic oxide particles in advance as a dispersant for the fine inorganic oxide particles.

Though there is no particular limitation on the amount of using the organic solvent, it is desired to use the organic solvent in a total amount of 100 to 2500 parts by mass and, particularly, 140 to 1500 parts by mass per 100 parts by mass of the alkoxysilane compound to obtain preservation stability and sufficient degree of abrasion resistance.

—Polymerizing Catalyst—

The coating agent composition of the present invention must use at least an acetylacetonato complex as a polymerizing catalyst for the alkoxysilane (condition (1) mentioned earlier).

That is, upon being blended with the acid, the alkoxysilane undergoes the hydrolysis and part of the hydrolyzed product may often be condensed to form a polymer such as dimer or trimer without, however, undergoing the polycondensation to a high degree. Therefore, the present invention uses an acetylacetonato complex as a polymerization catalyst for accelerating the polycondensation of the hydrolyzed product of alkoxysilane. It is allowable to use the polymerizing catalyst other than the acetylacetonato complex in combination with the acetylacetonato complex. To obtain a cured film having a high abrasion resistance even under the curing conditions of a relatively low temperature and for a short period of time, it is desired that the amount of the acetylacetonato complex is not smaller than 90% by mass, preferably, not smaller than 95% by mass and, most preferably, 100% by mass of the total amount of the polymerizing catalyst (i.e., the polymerizing catalyst is all acetylacetonato complex). By using the acetylacetonato complex as the polymerizing catalyst, it is allowed to effect the curing at a further decreased temperature, to prevent the lens from developing color due to the heat of curing, and to maintain the color tone even when the coating agent composition is directly applied to the lens material containing a coloring matter.

As the acetylacetonato complex, there can be used any known complexes that have been disclosed in, for example, JP-A-11-119001 without any limitation. Concrete examples of the acetylacetonato complex include aluminum acetylacetonato, indium acetylacetonato, chrome acetylacetonato, nickel acetylacetonato, titanium acetylacetonato, iron acetylacetonato, zinc acetylacetonato, cobalt acetylacetonato, copper acetylacetonato, and zirconium acetylacetonato, which can be used in one kind or in a combination of two or more kinds. Among them, it is most desired in the present invention to use aluminum acetylacetonato and/or titanium acetylacetonato from the standpoint of little initial coloring when the coating agent composition is used for the lenses that contain the photochromic compound.

As the polymerizing catalyst that can be used in combination with the acetylacetonato complex, there can be used perchlorates such as magnesium perchlorate, aluminum perchlorate, zinc perchlorate and ammonium perchlorate; organometal salts such as sodium acetate, zinc naphthenate, cobalt naphthenate and zinc octylate; and Lewis acids such as stannic chloride, aluminum chloride, ferric chloride, titanium chloride, zinc chloride and antimony chloride. In the coating agent composition of the present invention, it is desired that the polymerizing catalyst is used in a total amount of 0.1 to 15 parts by mass and, particularly, 0.2 to 10 parts by mass per 100 parts by mass of the alkoxysilane compound to obtain a hard cured film or to suppress the occurrence of cracks in the coated film after having been cured.

—Catalyst Stabilizer (β-Dicarbonyl Compound)—

The coating agent composition of the present invention must use a β-dicarbonyl compound other than the acetylacetonato complex as a catalyst stabilizer for improving the preservation stability (condition (2) described earlier). When blended with other stabilizer, the effect of the present invention is not obtained, or the stabilizing effect can be obtained to a satisfactory degree only in the initial period of preparation but does not last after preserved for extended periods of time, there arouse such problems as an increase in the viscosity of the coating agent composition and a decrease in the abrasion resistance of the cured film that is obtained.

The β-dicarbonyl compound used in the present invention is expressed by, for example, the following formula,

$$R^1-CO-CH_2-CO-R^2$$

wherein $R^1$ is an alkyl group having 1 to 4 carbon atoms or an aryl group having 6 to 14 carbon atoms, and $R^2$ is an alkyl group or an alkoxy group having 1 to 4 carbon atoms, or an aryl group having 6 to 14 carbon atoms.

That is, when the coating agent composition containing the acetylacetonato complex is preserved for extended periods of time, the fine inorganic oxide particles and the alkoxysilane compound in the coating agent composition gradually undergo the condensation due to the catalytic effect of the complex. This results in an increase in the viscosity of the coating agent composition or a decrease in the properties of the cured film that is obtained, arousing a problem of, for example, a decrease in the abrasion resistance. When blended with the β-dicarbonyl compound as described above, however, the acetylacetonato complex is stabilized and the condensation is effectively suppressed during the preservation. Even when the coating agent composition is preserved for extended periods of time, therefore, the cured film equivalent to the one having initial properties is obtained through the curing at a low temperature and for a short period of time.

Concrete examples of the β-dicarbonyl compound that can be preferably used in the present invention include acetylacetone, methyl acetoacetate, ethyl acetoacetate, n-propyl acetoacetate, i-propyl acetoacetate, n-butyl acetoacetate, t-butyl acetoacetate, 1-phenyl-1,3-butanedion, 1,3-diphenyl-1,3-propanedion and the like, which may be used in one kind or in a combination of two or more kinds.

The amount of blending the β-dicarbonyl compound is desirably in a range of 0.1 to 600 parts by mass and, particularly, 1 to 200 parts by mass per 100 parts by mass of the alkoxysilane compound in order to maintain the catalyst stability to a sufficient degree and to minimize the coloring of the coating agent composition.

—Other Blending Agents—

As required, the coating agent composition of the present invention may, further, be blended with photochromic compound, surfactant, anti-oxidizing agent, radical trapping agent, ultraviolet ray stabilizer, ultraviolet ray absorber, parting agent, coloring preventing agent, antistatic agent, fluorescent dye, dye, pigment, perfume, plasticizer and the like in one kind or in a combination of two or more kinds in addition to the above-mentioned essential components so far as they do not impair the effect of the present invention of forming the cured film through the curing at a low temperature for a short period of time.

The surfactant may be any one of the nonionic type, anionic type or cationic type. From the standpoint of wettability to the plastic lens material, however, it is desired to use a surfactant of the nonionic type. Concrete examples of the nonionic surfactant that can be preferably used include sorbitan fatty acid ester, glycerin fatty acid ester, decaglycerin fatty acid ester, propylene glycol/pentaerythritol fatty acid ester, polyoxyethylene sorbitan fatty acid ester, polyoxyethylene sorbit fatty acid ester, polyoxyethylene glycerin fatty acid ester, polyethylene glycol fatty acid ester, polyoxyethylenealkyl ether, polyoxyethylene phytosterol/phytostanol, polyoxyethylenepolyoxypropylenealkyl ether, polyoxyethylenealkylphenyl ether, polyoxyethylene castor oil/cured castor oil, polyoxyethylenelanolin/lanolin alcohol/bee wax derivative, polyoxyethylenealkylamine/fatty acid amide, polyoxyethylenealkylphenylformaldehyde condensation product, single-chain polyoxyethylenealkyl ether and the like. The surfactants may be used in two or more kinds being mixed together. It is desired that the amount of addition of the surfactant is in a range of 0.01 to 3 parts by mass per 100 parts by mass of the total amount of the essential components described above.

As the anti-oxidizing agent, radical trapping agent, ultraviolet ray stabilizer and ultraviolet ray absorber, there can be preferably used a hindered amine lightstabilizer, a hindered phenol anti-oxidizing agent, a phenol-type radical trapping agent, a sulfur-type anti-oxidizing agent, a benzotriazole-type compound and a benzophenone-type compound. It is desired that the amount of addition of the blending agents is in a range of 0.001 to 20 parts by mass per 100 parts by mass of the total amount of the essential components described above.

As the dye and the pigment, there can be exemplified a nitroso dye, nitro dye, azo dye, stilbenzoazo dye, ketoimine dye, triphenylmethane dye, xanthene dye, acridine dye, quinoline dye, methine dye, polymethine dye, thiazole dye, indamine dye, indophenol dye, azine dye, oxazine dye, thiazine dye, sulfur dye, aminoketone dye, oxyketone dye, anthraquinone dye, perinone dye, indigoid dye, phthalocyanine dye, azo pigment, anthraquinone pigment, phthalocyanine pigment, naphthalocyanine pigment, quinacridone pigment, dioxazine pigment, indigoid pigment, triphenylmethane pigment and xanthene pigment. It is desired to suitably determine the use of the dye and the pigment depending upon the color density of the plastic material that is to be colored.

—Preparation of the Coating Agent Composition—

The coating agent composition of the present invention can be prepared by weighing and mixing the components in predetermined amounts. There is no particular limitation on the order of adding the components, and the components may all be added simultaneously. Or, as described earlier, an acid aqueous solution of may be added to the polymerizable alkoxysilane compound to conduct the partial hydrolysis or the partial condensation in advance, followed by the addition and mixing of an organic solvent, a dispersion solution of fine metal oxide particles, the polymerizing catalyst and other additives.

—Use—

The coating agent composition of the present invention prepared as described above is, as required, filtered to remove foreign matter, is applied to the surfaces of a plastic material such as a plastic lens, dried and is cured to form a cured film.

The coating agent composition of the present invention can be preferably used as a hard coating solution for plastic spectacle lenses, not only offers a cured film having a hardness and an abrasion resistance comparable to those of when the conventional hard coating solution is used but also imparts luster to the side surfaces of the lens material when it is applied to the side surfaces. When the coating agent composition is applied onto the plastic lens material containing a coloring matter, such as sunglass lenses (which, as required, may have been treated on the surfaces thereof with an alkali) without interposing a primer layer to form a cured film, there is obtained a feature in that the color tone of the coloring matter is not changed.

The coating agent composition of the present invention can be used as a coating agent for plastic optical materials such as lenses of cameras, liquid crystal displays, and windowpanes of houses and automobiles, as a matter of course.

There is no particular limitation on the plastic materials to which the coating agent composition of the invention is to be applied, and there can be used known resins without limitation, such as (meth)acrylic resin, polycarbonate resin, allylic resin, thiourethane resin, urethane resin and thioepoxy resin.

As the coloring matter to be contained in the plastic material, further, there can be used photochromic compounds in addition to the dyes and pigments mentioned above. When the coating agent of the present invention is applied to the surfaces of the plastic material that uses a photochromic compound, the photochromic compound exhibits improved light resistance and weather-proof property. Therefore, the lens develops yellow color little which is caused by the deteriorated photochromic compound and, there is obtained a photochromic lens having good light resistance against the repetition of developing color and fading, which is a feature of a photochromic compound over extended periods of time.

The plastic material containing a coloring matter stands for a plastic material having a coloring matter existing near the surface of, or throughout the whole of, the plastic material, or a plastic material having a laminated layer structure including a layer containing the coloring matter applied onto at least one surface of the plastic material. The coating agent composition of the present invention is applied just on a region where the coloring matter is existing to form a cured film, and is establishing such a structural relationship that the coloring matter directly reacts with the substance in the coating agent composition. Further, any method can be used without limitation for containing the coloring matter in the plastic material. Generally, there can be used a dyeing method, an imbibing method, a kneading method or a coating method.

In applying the coating agent composition of the present invention, the surfaces of the material may be subjected to the physical etching in advance, such as treatment with an alkali, treatment with an acid, polishing, treatment with a plasma or treatment with a corona discharge, or to the chemical etching or to a treatment for introducing functional groups, or a primer layer may be formed thereon.

There is no particular limitation on the method of applying the coating agent composition onto the surfaces of the material, and any known method can be used. For example, there can be employed a dipping method, a spin-coating method, a dip spin-coating method, a spraying method, a brush-applying method or a roller-applying method.

After applying, the coating agent composition is usually dried in the dry air or in the air, followed by the heat treatment to effect the curing and to form a cured film (so-called hard coating). The heating temperature is not lower than 80° C. and, preferably, 100 to 110° C. though it may vary depending upon the material. In particular, the coating agent composition of the present invention forms a cured film having a sufficiently large hardness and abrasion resistance through the curing at a temperature of 100 to 110° C. effected for 1 to 2 hours, and features very excellent productivity.

The thickness of the cured film formed as described above can be selected to be about 0.1 to 50 microns. Usually, however, the thickness of the cured film is 1 to 10 microns when applied to the spectacle lenses. As required, further, the cured film may be subjected to the working and the secondary treatment, such as reflection-preventing treatment by depositing a thin film of a metal oxide such as $SiO_2$, $TiO_2$ or $ZrO_2$ or application of a thin film of an organic high-molecular material, and anti-static treatment.

EXAMPLES

The invention will now be described by way of Examples to which only, however, the invention is in no way limited.

Example 1

(1) Preparation of a Coating Agent Composition 45.2 Parts by mass of a γ-glycidoxypropyltrimethoxysilane was added dropwise to 10.3 parts by mass of a hydrochloric acid aqueous solution of 0.05 N with stirring. After the dropwise addition has been finished, the mixture was stirred at room temperature for 2 hours to obtain a partly hydrolyzed product of the γ-glycidoxypropyltrimethoxysilane.

Next, to the above partly hydrolyzed product, there were added:

| | |
|---|---|
| methanol (organic solvent): | 13.0 parts by mass, |
| ethylene glycol monoisopropyl ether (organic solvent): | 4.50 parts by mass, |
| acetylacetone (organic solvent): | 10.1 parts by mass, |
| t-butyl alcohol (organic solvent): and | 10.1 parts by mass, |
| silicone surfactant (L-7001, manufactured by Nihon Unicar): | 0.10 part by mass |
| with stirring, and to which were further added: | |
| silica sol dispersed in methanol (fine inorganic oxide particles)(manufactured by Nissan Kagaku Kogyo Co., silica content of 30% by mass, methanol(organic solvent) content of 70% by mass): | 107 parts by mass, |
| aluminum acetylacetonato (catalyst stabilizer): and | 0.32 parts by mass, |
| dye (trade name: Diaresin Blue N, manufactured by Mitsubishi Kagaku Co.): | 0.0020 parts by mass | in this order, and the mixture was stirred and matured at room temperature a whole day and night. The solution was filtered through a one-micron filtering paper to obtain a coating agent composition shown in Table 1-1.

(2) Measurement of Solid Component Concentration

2 Grams of the coating agent composition obtained above was weighed into an aluminum cup and was heated at 120° C. for 2 hours in an air oven to remove the volatile components. The weight (by mass) of the residue was measured and its ratio to the whole mass of the coating agent composition was regarded to be a solid component concentration. The results were as shown in Table 1-1.

(3) Formation of the Cured Film (Hard Coating)

The surface of the diethylene glycol bisallyl carbonate lens was dip-coated with the coating agent composition obtained above at a lift-up rate of 10 cm/min. Thereafter, the coating agent composition was pre-dried at 60° C. for 20 minutes and was, then, cured at 100° C. for 2 hours to form a cured film.

(4) Evaluation of the Cured Film

The thus obtained cured film was evaluated concerning the following items (a) to (g).

(a) Appearance.

The films were observed by eyes for their transparency and irregular coating. The films having good appearance were represented by ○, and the films having poor appearance were represented by X. The results were as shown in Table 2.

(b) Luster on Side Surfaces.

Luster on the side surfaces was observed by eyes. The side surfaces having good luster were represented by ○, and the side surfaces having poor luster were represented by X. The results were as shown in Table 2.

(c) Abrasion Resistance.

The surfaces of the lenses were rubbed 10 round trips by using a steel wool (trade name: Bonstar #0000, manufactured by Nihon Steel Wool Co.), and the scratched degrees were evaluated by eyes into five steps. The results were as shown in Table 2. The references of evaluation were as follows:

A: Were not almost scratched.
B: Scratched very little.
C: Scratched a little.
D: Scratched obviously.
E: The film peeled.

(d) Adhesiveness.

Adhesiveness between the cured film and the lens was evaluated by a cross-cut tape testing in compliance with JIS D-0202. That is, by using a cutter knife, lines were cut in the surface of the lens maintaining a gap of 1 mm to form 100 squares. A cellophane adhesive tape (manufactured by Nichiban Co.) was strongly stuck thereto and was pulled and peeled off at one time in a direction of 90 degrees from the surfaces thereof, and the number of squares remaining on the film were counted. The results were expressed as (the numbers of squares remaining)/100. The results were as shown in Table 2.

(e) Degree of Yellow Color ($YI_0$).

The degree of yellow color or Yellowness Index ($YI_0$) of the lenses after the film has been formed was evaluated by using a color computer (manufactured by Suga Shikenki Co.). The results were as shown in Table 2. The lower the $YI_0$ values, the smaller the degrees of yellow color of the lenses indicating that the lenses are desirable.

(f) Weather-Proof Property (Change in the Degree of Yellow Color ($\Delta YI$)).

To evaluate the change in the degree of yellow color by the irradiation with light, the following deterioration acceleration testing was conducted. Namely, the obtained lenses were deteriorated in an accelerated manner by using a Xenon Weather Meter X25 manufactured by Suga Shikenki Co. for 200 hours. Thereafter, the degree of yellow color was evaluated, the degree of yellow color after the testing ($YI_{200}$) was measured, and a value $\Delta YI$ calculated according to the formula, $$\Delta YI = YI_{200} - YI_0 \quad 5$$

was regarded to be a change in the degree of yellow color, and was used as an index of weather-proof property. The results were as shown in Table 2. The smaller the change in the degree of yellow color, the higher the weather-proof property.
(g) Preservation Stability of the Coating Agent Composition.

After the coating agent compositions were preserved at 25° C. for 2 weeks and 4 weeks, the cured films were formed by the above-mentioned method of forming the cured films to evaluate the above items (a) to (d) again. The results were as shown in Table 3.

Examples 2 to 10 and Comparative Examples 1 to 5

The coating agent compositions were prepared in the same manner as in Example 1 but varying the compositions as shown in Tables 1-1 and 1-2. The results were as shown in Tables 1-1 and 1-2. Further, the cured films were formed under the same cured-film-forming conditions as those of Example 1, and were evaluated. The results were as shown in Tables 2 and 3.

TABLE 1

| | Blend (mass parts) | Ex. 1 | Ex. 2 | Ex. 3 | Ex. 4 | Ex. 5 | Ex. 6 | Ex. 7 | Ex. 8 |
|---|---|---|---|---|---|---|---|---|---|
| (a) | γ-Glycidoxypropyl-trimethoxysilane | 45.2 | 41.0 | 40.2 | 39.0 | 49.0 | 36.2 | 36.7 | 45.2 |
| | Tetraethoxysilane | | | 7.0 | | | | | |
| (b) | 0.05N hydrochloric acid | 10.3 | 9.38 | 11.3 | 9.12 | 11.20 | 8.12 | 8.41 | 10.3 |
| | Acetylacetone | 10.1 | 10.9 | 10.1 | 10.9 | 7.45 | 11 | 11.6 | |
| (c) | Methyl acetoacetate | | | | | | | | 10.1 |
| | i-Propyl acetoacetate | | | | | | | | |
| | 1,3-Diphenyl-1,3-propanedion | | | | | | | | |
| | Methanol | 13.0 | 26.4 | 2.7 | 26.4 | | 44 | 39.8 | 13.0 |
| (d) | Ethylene glycol monoisopropyl ether | 4.50 | 4.83 | 4.50 | 4.83 | | 5.37 | 5.15 | 4.50 |
| | t-Butanol | 10.1 | 10.9 | 10.1 | 10.9 | 10 | 12.1 | 11.6 | 10.1 |
| | Diacetone alcohol | | | | | 5.15 | | | |
| (e) | Silica sol dispersed in methanol (silica content, 30 mass %) | 107 | 96.7 | 114 | 100 | 117.0 | 83.0 | 86.7 | 107 |
| | Al acetylacetate | 0.32 | 0.29 | 0.35 | 0.3 | 0.52 | 0.24 | 0.26 | 0.32 |
| (f) | Sodium acetate | | | | | | | | |
| | Ammonium perchlorate | | | | | | | | |
| (g) | Surfactant | 0.10 | 0.10 | 0.10 | 0.10 | 0.10 | 0.10 | 0.10 | 0.10 |
| (h) | Dye | 0.0020 | | | | | | | 0.0020 |
| | Solid component concentration | 35 | 32 | 35 | 32 | 39 | 27 | 29 | 35 |
| | Mass ratio of silica in (a) and (e) occupying the coating agent composition | 32 | 29 | 31 | 29 | 35 | 25 | 26 | 32 |

| | Blend (mass parts) | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|---|
| (a) | γ-Glycidoxypropyl-trimethoxysilane | 45.2 | 45.2 | 41.0 | 41.0 | 41.0 | 65.0 | 24.0 |
| | Tetraethoxysilane | | | | | | | |
| (b) | 0.05N hydrochloric acid | 10.3 | 10.3 | 9.38 | 9.38 | 9.38 | 15.0 | 5.5 |
| | Acetylacetone | 5.1 | 1.0 | 10.9 | | | | 13.8 |
| (c) | Methyl acetoacetate | | | | | | | |
| | i-Propyl acetoacetate | 5.0 | | | | | | |
| | 1,3-Diphenyl-1,3-propanedion | | 9.0 | | | | | |
| | Methanol | 13.0 | 13.0 | 26.4 | 26.4 | 26.4 | | 80.0 |
| (d) | Ethylene glycol monoisopropyl ether | 4.50 | 4.50 | 4.83 | 4.83 | 4.83 | | 6.14 |
| | t-Butanol | 10.1 | 10.1 | 10.9 | 10.9 | 10.9 | | 13.8 |
| | Diacetone alcohol | | | | 10.9 | 10.9 | | |
| (e) | Silica sol dispersed in methanol (silica content, 30 mass %) | 107 | 107 | 96.7 | 96.7 | 96.7 | 120 | 56.7 |
| | Al acetylacetate | 0.32 | 0.32 | | | | 0.35 | 0.17 |
| (f) | Sodium acetate | | | | | 0.29 | | |
| | Ammonium perchlorate | | | 0.18 | 0.18 | | | |
| (g) | Surfactant | 0.10 | 0.10 | 0.10 | 0.10 | 0.10 | 0.10 | 0.10 |
| (h) | Dye | 0.0020 | 0.0020 | | | | | |
| | Solid component concentration | 35 | 35 | 32 | 32 | 31 | 44 | 19 |
| | Mass ratio of silica in (a) and (e) occupying the coating agent composition | 32 | 32 | 29 | 29 | 29 | 41 | 17 |

TABLE 2

| Coating composition | Appearance | Luster of side surfaces | Abrasion resistance | Adhesiveness | Degree of yellow color YI$_0$ | Weather-proof property YI$_{200}$ | ΔYI |
|---|---|---|---|---|---|---|---|
| Ex. 1 | ○ | ○ | A | 100/100 | 0.67 | 1.25 | 0.58 |
| Ex. 2 | ○ | ○ | A | 100/100 | 0.84 | 1.18 | 0.34 |
| Ex. 3 | ○ | ○ | A | 100/100 | 0.87 | 1.28 | 0.41 |
| Ex. 4 | ○ | ○ | A | 100/100 | 0.69 | 1.48 | 0.79 |
| Ex. 5 | ○ | ○ | A | 100/100 | 0.89 | 1.25 | 0.36 |
| Ex. 6 | ○ | ○ | A | 100/100 | 0.71 | 1.41 | 0.70 |
| Ex. 7 | ○ | ○ | A | 100/100 | 0.75 | 1.39 | 0.64 |
| Ex. 8 | ○ | ○ | A | 100/100 | 0.70 | 1.16 | 0.46 |
| Ex. 9 | ○ | ○ | A | 100/100 | 0.75 | 1.21 | 0.46 |
| Ex. 10 | ○ | ○ | A | 100/100 | 0.67 | 1.26 | 0.59 |
| Comp. Ex. 1 | ○ | x | E | 100/100 | 0.71 | 1.42 | 0.71 |
| Comp. Ex. 2 | ○ | ○ | A | 100/100 | 0.68 | 1.42 | 0.74 |
| Comp. Ex. 3 | ○ | ○ | A | 100/100 | 0.66 | 1.45 | 0.79 |
| Comp. Ex. 4 | ○ | ○ | A | 100/100 | 0.77 | 1.24 | 0.47 |
| Comp. Ex. 5 | ○ | x | A | 100/100 | 0.69 | 1.37 | 0.68 |

TABLE 3

| Coating composition | Preservation stability | | | | | | | |
|---|---|---|---|---|---|---|---|---|
| | Appearance | | Luster of side surfaces | | Abrasion resistance | | Adhesiveness | |
| | 2 weeks | 4 weeks | 2 weeks | 4 weeks | 2 weeks | 4 weeks | 2 weeks | 4 weeks |
| Ex. 1 | ○ | ○ | ○ | ○ | A | A | 100/100 | 100/100 |
| Ex. 2 | ○ | ○ | ○ | ○ | A | A | 100/100 | 100/100 |
| Ex. 3 | ○ | ○ | ○ | ○ | A | B | 100/100 | 100/100 |
| Ex. 4 | ○ | ○ | ○ | ○ | A | B | 100/100 | 100/100 |
| Ex. 5 | ○ | ○ | ○ | ○ | A | A | 100/100 | 100/100 |
| Ex. 6 | ○ | ○ | ○ | ○ | A | A | 100/100 | 100/100 |
| Ex. 7 | ○ | ○ | ○ | ○ | A | A | 100/100 | 100/100 |
| Ex. 8 | ○ | ○ | ○ | ○ | A | A | 100/100 | 100/100 |
| Ex. 9 | ○ | ○ | ○ | ○ | A | A | 100/100 | 100/100 |
| Ex. 10 | ○ | ○ | ○ | ○ | A | A | 100/100 | 100/100 |
| Comp. Ex. 1 | ○ | ○ | x | x | E | E | 100/100 | 100/100 |
| Comp. Ex. 2 | ○ | ○ | x | x | E | E | 100/100 | 100/100 |
| Comp. Ex. 3 | ○ | ○ | ○ | x | E | E | 100/100 | 100/100 |
| Comp. Ex. 4 | ○ | ○ | ○ | x | B | E | 100/100 | 100/100 |
| Comp. Ex. 5 | ○ | ○ | x | x | B | B | 100/100 | 100/100 |

When the coating agent compositions (Examples 1 to 10) are used as will be understood from the above experimental results, there are obtained cured films (hard coatings) maintaining a good balance in the properties such as abrasion resistance, adhesiveness and degree of yellow color even under the curing conditions of a low temperature for a short period of time of 100° C. and 2 hours as compared to the cases of when the coating agent compositions of Comparative Examples 1 to 5 are used. It is further made possible to impart luster to the side surfaces of the lens after it has been coated. Moreover, the coating agent compositions of the present invention offer cured films maintaining excellent abrasion resistance even after preserved for extended periods of time, and feature excellent preservation stability.

Example 11

The diethylene glycol bisallyl carbonate lens material of Example 1 was dyed with a dye (trade name, BPI R SunGray) to obtain a lens containing a coloring matter. A cured film was formed on the surfaces of the coloring matter-containing plastic material. A change in the color tone before and after the cured film was formed was found as a* and b* by using the color computer described above and was further evaluated by eyes. The results were as shown in Table 4.

Examples 12 to 20

Cured films were formed in the same manner as in Example 11 but using the dyes shown in Figure 4 instead of the one used in Example 11 and using the coating agent compositions of Examples 2 to 10. Changes in the color tone before and after the cured films were formed were evaluated. The results were as shown in Table 4

Comparative Examples 6 and 7

Cured films were formed in the same manner as in Examples 11 and 12 but using the coating agent compositions of Comparative Examples 1 and 2, and changes in the color tone before and after the cured films were formed were evaluated. The results were as shown in Table 4.

TABLE 4

| | Coating agent composition | Dye | Before coated | | | After coated | | |
|---|---|---|---|---|---|---|---|---|
| | | | a* | b* | Observed color tone | a* | b* | Observed color tone |
| Ex. 11 | Ex. 1 | Sun Gray | −0.17 | 0.37 | gray | −0.27 | 0.66 | gray |
| Ex. 12 | Ex. 2 | Clear Blue | −0.14 | −4.7 | blue | −0.19 | −4.18 | gray |
| Ex. 13 | Ex. 3 | Sun Gray | −0.17 | 0.37 | gray | −0.24 | 0.62 | gray |
| Ex. 14 | Ex. 4 | Sun Gray | −0.17 | 0.37 | gray | −0.25 | 0.65 | gray |
| Ex. 15 | Ex. 5 | Sun Gray | −0.17 | 0.37 | gray | −0.31 | 0.6 | gray |
| Ex. 16 | Ex. 6 | Sun Gray | −0.17 | 0.37 | gray | −0.26 | 0.58 | gray |
| Ex. 17 | Ex. 7 | Clear Blue | −0.14 | −4.7 | blue | −0.23 | −4.25 | gray |
| Ex. 18 | Ex. 8 | Sun Gray | −0.17 | 0.37 | gray | −0.25 | 0.54 | gray |
| Ex. 19 | Ex. 9 | Sun Gray | −0.17 | 0.37 | gray | −0.28 | 0.58 | gray |
| Ex. 20 | Ex. 10 | Sun Gray | −0.17 | 0.37 | gray | −0.27 | 0.63 | gray |
| Comp. Ex. 6 | Comp. Ex. 1 | Sun Gray | −0.17 | 0.37 | gray | −0.18 | 1.53 | yellowish gray |
| Comp. Ex. 7 | Comp. Ex. 2 | Clear Blue | −0.14 | −4.7 | blue | 0.1 | −3.47 | yellowish blue |

Example 21

The components of the following recipe:
trimethylolpropane trimethacrylate: 15 parts by mass,
2,2-bis(4-acryloyloxypolyethylene glycol phenyl)propane having an average molecular weight of 776: 50 parts by mass,
polyethylene glycol diacrylate having an average molecular weight of 532: 15 parts by mass,
polyester oligomer hexaacrylate (trade name, EB1830, manufactured by Dycell UCB Co.): 10 parts by mass
glycidyl methacrylate: 10 parts by mass
γ-metacryloyloxypropyltrimethoxysilane: 5 parts by mass,
were mixed together to a sufficient degree to prepare a mixture of radically polymerizable monomers.

Next, the following photochromic compounds 1 to 4:
photochromic compound 1: 0.10 part by mass,
photochromic compound 2: 2.0 parts by mass,
photochromic compound 3: 0.09 parts by mass,
photochromic compound 4: 2.5 part by mass,
were mixed to the mixture of the above radically polymerizable monomers, and to which were further added 3 parts by mass of an N-methyldiethanolamine, 5 parts by mass of a hindered amine-type lightstabilizer (LS765 manufactured by Sankyo Co.) and 0.4 parts by mass of a photopolymerization initiator (Irgacure 1800, manufactured by Chiba Specialty Chemical Co.), which were mixed together to a sufficient degree to obtain a photocurable coating agent.

Photochromic Compound 1:

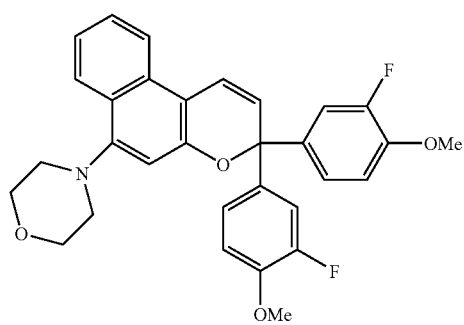 [SMILES: COc1ccc(C2(c3ccc(OC)c(F)c3)C=Cc3c(cc(N4CCOCC4)c4ccccc34)O2)cc1F]

Photochromic Compound 2:

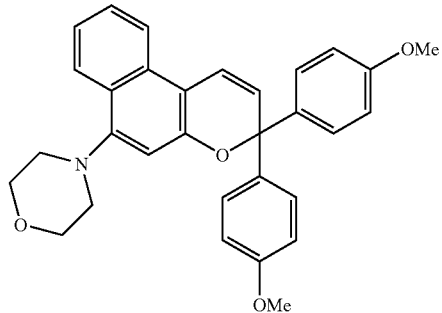 [SMILES: COc1ccc(C2(c3ccc(OC)cc3)C=Cc3c(cc(N4CCOCC4)c4ccccc34)O2)cc1]

Photochromic Compound 3:

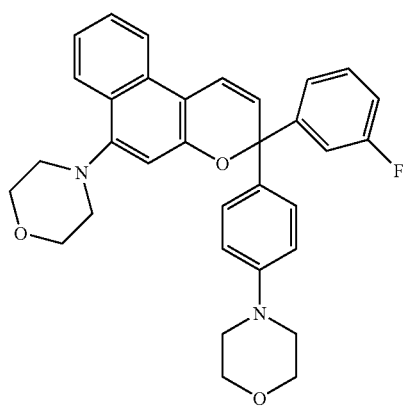 [SMILES: Fc1cccc(C2(c3ccc(N4CCOCC4)cc3)C=Cc3c(cc(N4CCOCC4)c4ccccc34)O2)c1]

Photochromic Compound 4:

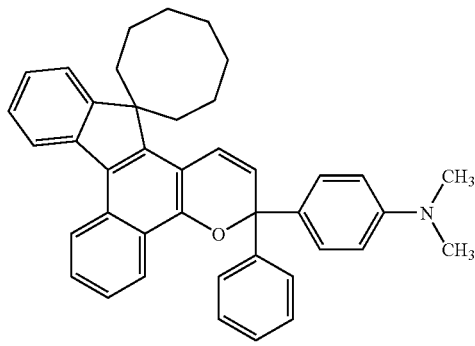 [SMILES: CN(C)c1ccc(C2(c3ccccc3)C=Cc3c4c(c5ccccc5c3O2)-c2ccccc2C42CCCCCCC2)cc1]

Next, a thiourethane plastic lens having a refractive index of 1.60 was treated in a sodium hydroxide aqueous solution of 10% by mass at a liquid temperature of 50° C. for 5 minutes. Next, the convex surface of the lens was spin-coated with the above photocurable coating agent by using a spin coater 1H-DX2 manufactured by Mikasa Co. Here, the spin-coating conditions were so adjusted that the thickness of the coating of the photocurable coating agent after cured (thickness of the thin photochromic cured film) was 40±1 μm.

The lens was held with the convex surface coated with the photocurable coating agent being faced upwards, and the photocurable coating agent was cured by irradiating the lens with light emitted from a metal halide lamp of an irradiation intensity of about 120 mW/cm$^2$ equipped with a cold reflector in a nitrogen gas atmosphere for 180 seconds. Next, the lens was held with the convex surface of the lens being faced downward and was further heated at 120° C. for 1 hour to form a thin photochromic cured film.

By using a photochromic compound-containing plastic lens obtained by the above method instead of using the diethylene glycol bisallyl carbonate lens of Example 1, a cured film (hard coating) was formed on the surface of the lens in the same manner as in Example 1 by using the coating agent composition obtained in Example 1. The photochromic compound-containing plastic lens coated with the hard film obtained as described above was evaluated concerning the items (a) to (d) in the same manner as in Example 1, and was evaluated concerning the items (h) to (k) as described below. The results were as shown in Table 5.

(h) Maximum Absorption Wavelength ($\gamma_{max}$).

By using a xenon lamp L-2480 (300 watts) manufactured by Hamamatsu Photonics Co., the lens was irradiated with light through an ultraviolet-ray transmission filter UV22 and a heat ray absorption filter HA50 (both manufactured by HOYA Co.) for 120 seconds to develop a color under the following irradiation conditions:

Temperature of atmosphere: 20° C.±1° C.
Beam intensities on the lens surfaces:
365 nm=2.4 mW/cm$^2$,
245 nm=24 μW/cm$^2$, and a maximum absorption wavelength at this moment was found by using a spectrophotometer (instantaneous multichannel photodetector MCPD 3000) manufactured by Otsuka Denshi Kogyo Co. The maximum absorption wavelength was related to the color tone at the time when the color was developed.

(i) Color Density.

A difference $\{\epsilon(120)-\epsilon(0)\}$ was found between an absorbency $\{\epsilon(120)\}$ at the maximum absorption wavelength and an absorbency $\{\epsilon(0)\}$ at the above wavelength of the lens in a state of not irradiated with light, and was regarded to be a color density. It can be said that the higher this value is, the more excellent the photochromic properties are.

(j) Fading rate.

The time $\{t\frac{1}{2}(min)\}$ (half life of fading) until the absorbency of the lens at the maximum absorption wavelength dropped down to one-half the $\{\epsilon(120)-\epsilon(0)\}$ from when the lens was no longer irradiated with light after it was irradiated with light for 120 seconds, was measured. It can be said that the shorter the time (half life of fading) is, the faster the fading rate is and, hence, the more excellent the photochromic properties are.

(k) Light Resistance of Photochromic Properties.

The following deterioration acceleration testing was conducted in order to evaluate the light resistance of color developed by the irradiation with light. That is, the lens coated with the hard film was deteriorated in an accelerated manner by using a xenon weather meter X25 manufactured by Suga Shikenki Co. for 200 hours. Thereafter, the color densities were evaluated before and after the deterioration acceleration testing; i.e., a color density ($A_0$) before the deterioration acceleration testing and a color density ($A_{200}$) after the deterioration acceleration testing were measured to calculate a remaining factor (%) according to the following formula, Remaining factor(%)=$\{(A_{200}/A_0) \times 100\}$ to use the value as an index of the light resistance of the developed color.

By using a color computer (manufactured by Suga Shinki Co.), further, an Yellow Index was evaluated. A degree of yellow color ($YI_0$) before the deterioration acceleration testing and a degree of yellow color ($YI_{200}$) after the deterioration acceleration testing were measured, and ΔYI calculated according to the following formula,

ΔYI=$YI_{200}-YI_0$ was regarded to be a change in the degree of yellow color, and was used as an index of weather-proof property.

Example 22

A photochromic compound-containing plastic lens coated with the hard film was prepared in the same manner as in Example 21 but preparing the photocurable coating agent being blended with 3.0 parts by mass of the photochromic compound 4 only but without blended with the photochromic compounds 1 to 3, and was evaluated. The results were as shown in Table 5.

Example 23

The components of the following recipe:
trimethylolpropane trimethacrylate: 20 parts by mass,
2,2-bis(4-acryloyloxypolyethylene glycol phenyl)propane having an average molecular weight of 776: 45 parts by mass,
polyethylene glycol diacrylate having an average molecular weight of 532: 15 parts by mass,
polyester oligomer hexaacrylate (trade name, EB1830, manufactured by Dycell UCB Co.): 15 parts by mass,
glycidyl methacrylate: 5 parts by mass, and
γ-metacryloyloxypropyltrimethoxysilane: 5 parts by mass,
were mixed together to a sufficient degree to prepare a mixture of radically polymerizable monomers.

Next, to the mixture of the radically polymerizable monomers, there were added 2.5 parts by mass of a photochromic compound 4, 3 parts by mass of an N-methyldiethanolamine, 5 parts by mass of a hindered amine-type lightstabilizer (LS765 manufactured by Sankyo Co.) and 0.4 parts by mass of a photopolymerization initiator (Irgacure 1800, manufactured by Chiba Specialty Chemical Co.), which were mixed together to a sufficient degree to obtain a photocurable coating agent.

A photochromic compound-containing plastic lens coated with the hard coating layer was prepared in the same manner as in Example 21 but using the above photocurable coating agent and using the coating agent composition of Example 3, and was evaluated. The results were as shown in Table 5.

Example 24

A photocurable coating agent was prepared in the same manner as in Example 21 but using 0.1 part by mass of a surfactant (trade name, L-7001, manufactured by Nihon Unicar Co.) instead of using N-methyldiethanolamine.

Further, the following components:
polytetramethylene ether diol having an average molecular weight of 1000: 281 g,
1,2,6-hexanetriol: 67 g, and a mixture of 2,4-tolylenediisocyanate and 2,6-tolylenediisocyanate at a weight ratio of 80:20 (trade name, Cosmonate T-80, manufactured by Mitsui-Takeda Chemical Co.): 195 g,
were reacted together to prepare a polyisocyanate compound. To 100 parts by mass of the polyisocyanate compound, 200 parts by mass of an ethyl acetate was mixed followed by the addition of 0.5 parts by mass of a surfactant (trade name, L7001, manufactured by Nihon Unicar Co.). The mixture was stirred to a sufficient degree in a nitrogen atmosphere until it became homogeneous to prepare a primer composition.

The convex surface of the thiourethane plastic lens used in Example 21 was spin-coated with the above primer composition by using a spin coater 1H-DX2 manufactured by Mikasa Co. The lens was held in an environment of a temperature of 25° C. and a humidity of 40% RH for 10 minutes to cure the primer composition and to obtain a lens material having a primer layer on the surface thereof.

Next, the primer layer of the lens material was spin-coated with about 2 g of the photocurable coating agent prepared above in quite the same manner as in Example 21, and was irradiated with light and was heat-treated to form a thin photochromic cured film.

By using the plastic lens having the thin photochromic cured film obtained by the above method instead of using the diethylene glycol bisallyl carbonate lens of Example 1, a cured film of the coating agent composition obtained in Example 1 was formed on the surface of the lens in the same manner as in Example 1. The photochromic compound-containing plastic lens coated with the hard coating layer obtained above was evaluated in the same manner as in Example 21. The results were as shown in Table 5.

Example 25

To 40 parts by mass of the polyisocyanate compound prepared in Example 24, there were added 30 parts by mass of toluene and 0.5 parts by mass of propylene glycol, and the mixture was reacted at 80° C. for 5 hours. To the reaction product, 0.5 parts by mass of a surfactant (trade name, L7001, manufactured by Nihon Unicar) was added, and the mixture was stirred to a sufficient degree in a nitrogen atmosphere until it became homogeneous to prepare a moisture-curable primer composition.

By using the primer composition, there was prepared a lens material having a primer layer on the surface thereof in the same manner as in Example 24, and a thin photochromic cured film was formed on the surface of the primer layer.

By using the plastic lens having the thin photochromic cured film obtained above, a cured film of the coating agent composition obtained in Example 3 was formed on the surface of the lens in the same manner as in Example 3. The photochromic compound-containing plastic lens coated with the hard coating layer obtained above was evaluated in the same manner as in Examiner 21. The results were as shown in Table 5.

Example 26

A photocuring coating agent was prepared in the same manner as in Example 24 but being blended with 2.5 parts by mass of the following photochromic compound 5 instead of being blended with the photochromic compounds 1 to 4.
Photochromic Compound 5:

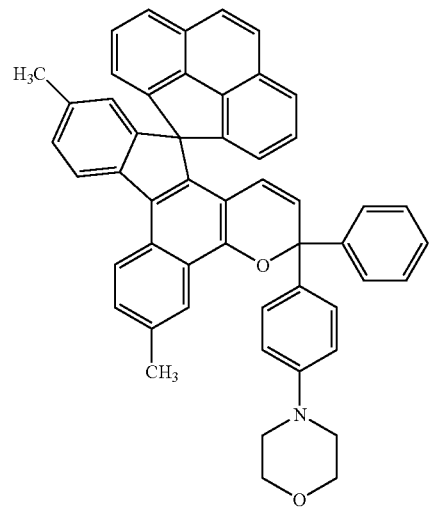 [SMILES: Cc1ccc2c(c1)C1(c3c4c(c5cc(C)ccc5c3-2)OC(c2ccccc2)(c2ccc(N3CCOCC3)cc2)C=C4)c2cccc3ccc4cccc1c4c23]

A photochromic compound-containing plastic lens coated with a hard coating layer was prepared by using the plastic lens having a thin photochromic cured film in the same manner as in Example 25 but using the above photocurable coating agent. The lens was evaluated in the same manner as in Example 25. The results were as shown in Table 5.

Comparative Example 8

A plastic lens having a thin photochromic cured film was prepared in the same manner as in Example 21 but without forming the hard coating, and was evaluated in the same manner as in Example 21. The results were as shown in Table 5.

Comparative Example 9

A photochromic compound-containing plastic lens coated with a hard film was prepared in the same manner as in Example 21 but using the coating agent composition of Comparative Example 1, and was evaluated. The results were as shown in Table 5.

Comparative Example 10

A photochromic compound-containing plastic lens coated with a hard film was prepared in the same manner as in Example 26 but using the coating agent composition of Comparative Example 5, and was evaluated. The results were as shown in Table 5.

TABLE 5

| Example No. | Appearance | Luster of side surface | Abrasion resistance | Adhesiveness | λmax (nm) | Color density | Fading speed (min) | Light resistance (%) | Weather-proof property ΔYI |
|---|---|---|---|---|---|---|---|---|---|
| 21 | ○ | ○ | A | 100/100 | 484 | 0.98 | 1.3 | 42 | 8.3 |
|   |   |   |   |   | 590 | 1.10 | 1.4 | 50 |   |
| 22 | ○ | ○ | A | 100/100 | 586 | 1.23 | 1.5 | 47 | 8.5 |
| 23 | ○ | ○ | A | 100/100 | 488 | 0.91 | 1.2 | 40 | 9.1 |
|   |   |   |   |   | 586 | 1.03 | 1.4 | 46 |   |
| 24 | ○ | ○ | A | 100/100 | 484 | 0.93 | 1.3 | 40 | 8.8 |
|   |   |   |   |   | 590 | 1.10 | 1.4 | 45 |   |
| 25 | ○ | ○ | A | 100/100 | 482 | 0.94 | 1.4 | 43 | 8.4 |
|   |   |   |   |   | 590 | 1.05 | 1.5 | 48 |   |
| 26 | ○ | ○ | A | 100/100 | 610 | 0.87 | 1.1 | 41 | 8.8 |
| Comp. Ex. 8 | — | — | E | — | 484 | 0.98 | 1.3 | 23 | 18.6 |
|   |   |   |   |   | 590 | 1.12 | 1.4 | 30 |   |
| COMP. Ex. 9 | ○ | x | E | 100/100 | 484 | 0.93 | 1.3 | 22 | 16.7 |
|   |   |   |   |   | 590 | 1.06 | 1.5 | 28 |   |
| COMP. Ex. 10 | ○ | x | A | 100/100 | 610 | 0.92 | 1.1 | 40 | 17.5 |

From the results of evaluation of Examples 21 to 26 and Comparative Examples 8 to 10, it will be learned that the coating agent compositions of the present invention exhibit excellent cured film properties such as luster of side surfaces, abrasion resistance and adhesiveness, as well as excellent photochromic properties such as weather-proof property and light resistance.

The invention claimed is:

1. A plastic lens obtained by forming a cured film comprising a cured product of a coating agent composition on surfaces of a plastic lens material that contains a photochromic compound as a coloring matter,
   with the proviso that the content of fine inorganic oxide particles in the cured film is 40 to less than 60% by mass of a solid component in the composition and the content of a hydrolyzed product of an alkoxysilane compound in the cured film is 40 to less than 60% by mass of a solid component in the composition;
   wherein the coating agent composition is obtained by mixing said fine inorganic oxide particles, said polymerizable alkoxysilane compound, a polymerizing catalyst, an acid aqueous solution and an organic solvent, and satisfies the following conditions (1) to (3):
   (1) said polymerizing catalyst is at least partly an acetylacetonato complex;
   (2) a β-dicarbonyl compound, excluding acetylacetonato complexes, having two carbonyl groups in the molecule via one carbon atom, is further contained as a catalyst stabilizer; and
   (3) said fine inorganic oxide particles and said alkoxysilane compound are contained in a total amount of 23 to 40% by mass.

2. A plastic lens according to claim 1, wherein said fine inorganic particles are fine silica particles.

3. A method of producing plastic lenses by applying a coating agent composition onto surfaces of a plastic lens material containing a photochromic compound as a coloring matter to form a coating layer thereon, and curing said coating layer to form a cured film thereof,
   with the proviso that the content of fine inorganic oxide particles in the cured film is 40 to less than 60% by mass of a solid component in the composition and the content of a hydrolyzed product of an alkoxysilane compound in the cured film is 40 to less than 60% by mass of a solid component in the composition;
   wherein the coating agent composition is obtained by mixing said fine inorganic oxide particles, said polymerizable alkoxysilane compound, a polymerizing catalyst, an acid aqueous solution and an organic solvent, and satisfies the following conditions (1) to (3):
   (1) said polymerizing catalyst is at least partly an acetylacetonato complex;
   (2) a β-dicarbonyl compound, excluding acetylacetonato complexes, having two carbonyl groups in the molecule via one carbon atom, is further contained as a catalyst stabilizer; and
   (3) said fine inorganic oxide particles and said alkoxysilane compound are contained in a total amount of 23 to 40% by mass.

* * * * *